May 9, 1933.                H. W. DAIN                1,908,660
                  INJECTION VALVE FOR A DIESEL ENGINE
                         Filed May 27, 1931

Inventor,
H. W. DAIN.
By Sterling P. Buck,
Attorney.

Patented May 9, 1933

1,908,660

UNITED STATES PATENT OFFICE

HARRINGTON WEBB DAIN, OF DONNA, TEXAS

INJECTION VALVE FOR A DIESEL ENGINE

Application filed May 27, 1931. Serial No. 540,487.

This invention relates to intermittent injection valves, and especially to an injection valve for a Diesel engine.

One object of this invention is to provide an exceedingly efficient fuel-injecting valve formed of the fewest initially separate parts so as to be produced and maintained at the lowest possible cost.

Another object is to provide a novel and improved valve including a manually adjustable valve-closure or port closure and fluid-flow regulator whereby the duration of flow for each revolution of the rotor can be lengthened and shortened at will of the operator of the engine to which it is attachable, or of which it is a part.

Other objects and important features are pointed out or implied in the following details of description in connection with the accompanying drawing in which.

Referring to this drawing in detail, in which similar numerals refer to similar parts in the several views, the invention is described in detail as follows.

Figure 1:
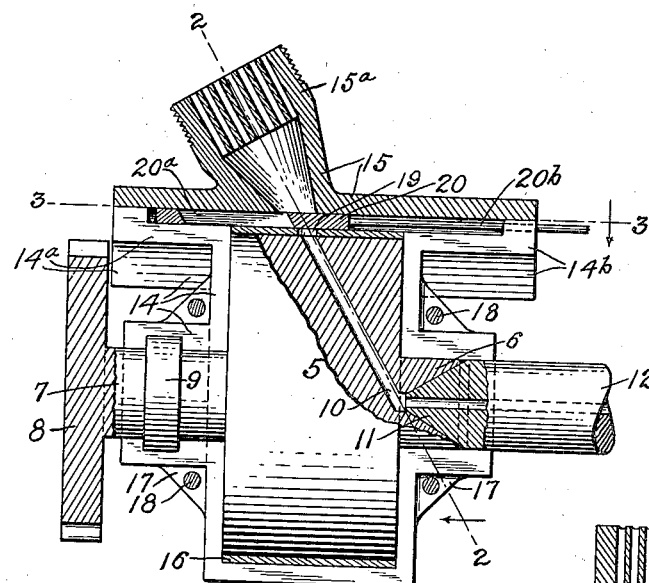
Fig. 1 is a view mainly in section, the section being taken in the plane of the axis of the rotor.
Figure 2:
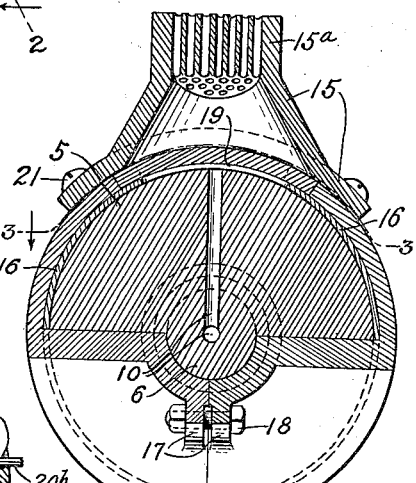
Fig. 2 is a view mainly in section, the section being taken along the line 2—2 of Fig. 1, and viewed in the direction of the arrow.
Figure 3:
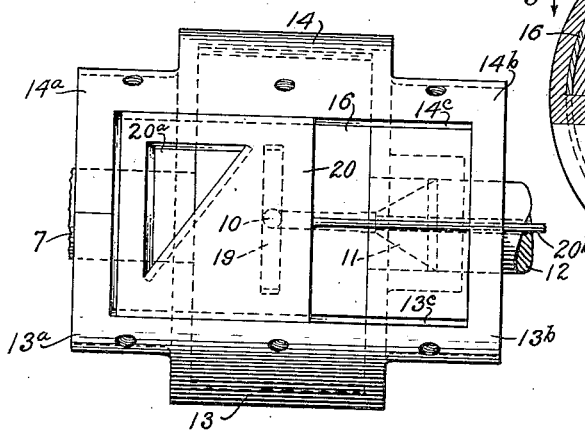
Fig. 3 is a view of the parts under the lines 3—3 of Figs. 1 and 2, showing the manually operable valve in the seat and guideway in which it is slidable.

The rotor, according to this form of the invention, is formed integrally by turning it from a single piece of metal, on a turning lathe, so as to form a cylindrical disc-like part 5, stub axles 6 and 7, and a gear-member which has teeth cut thereon for forming a gear-wheel 8 on the axle 7, this axle also having a peripheral ridge 9 thereon. The cylinder 5 is radially bored from a point in its periphery to the base of the stub axle 6, and the latter is axially bored to meet the radial bore and thus to form a liquid fuel passage 10. The axial bore is preferably (though not essentially) conical and inwardly tapered to closely fit around the conical end 11 of a tubular fuel-feeding member 12 which may be connected to any appropriate container (not shown) for supplying oil or other fuel to the engine.

The valve-casing is preferably formed of four initially separate parts 13, 14, 15 and 16. The parts 13 and 14 are complemental, each being an inverse duplicate of the other, and each is substantially semi-cylindrical and provided with means to secure it to the other, for instance, apertured ears 17 and screw-threaded fasteners 18. The member 16 is a hollow right circular cylinder which fits tightly within the hollow right circular cylinder formed by the parts 13 and 14 when the fasteners 18 are tightened, but which is adjustable around its axis when the fasteners are loosened, so as to angularly adjust its peripherally extending slot 19 for the desired cooperation with the slidable valve-closure 20. Each member 13 and 14 is formed with axially parallel arcuate flanges 13a and 13b, 14a and 14b, respectively. These flanges are formed with threaded apertures to receive screws 21 for securing the member 15 in place. This member 15 constitutes a combined attaching unit for securing the device to a cylinder of a Diesel engine, a cover for the valve-seat formed by the flanges and intermediate parts of the members 13 and 14, and a spraying nozzle for dividing the fluid-fuel into small jets as it enters the engine-cylinder. The spraying nozzle 15a is preferably screw-threaded for engagement with an internally threaded opening in the engine-cylinder (not shown).

The valve-closure 20 is provided with a triangular opening 20a which is moved into and out of communication with the slot 19 and passage 10 by means of a rod 20b which is united with the arcuate plate or valve-closure 20 and extends out through complemental grooves between the flanges 13a and 14a, or 13b and 14b. This rod 20b can be moved inward and outward manually and can be held in different adjusted positions by any appropriate means (not shown). The flanges of the members 13 and 14 are formed with parallel walls 13c and 14c which serve as tracks or a guideway against which the straight edges of the valve member 20 slide when being adjusted.

In the drawing, the valve is shown in the closed relation, that is, the opening or triangular aperture 20a being out of communication of the slot 19, although the passage 10 is in open communication with the slot 19. It should be understood that the opening 10 moves along the slot 19 during every revolution of the rotor 5, and that this slot is filled with the liquid fuel in consequence of pressure under which the fuel is fed through the nozzle member 12. However, the spraying nozzle 15a receives the liquid fuel only when the opening 20a is in communication with the slot 19, and then, the duration of feeding is regulated by the position of the angular opening 20a over the slot 19, for it has the effect of practically lengthening or shortening the effective portion of the slot. It should also be understood that the gear wheel 8 effects rotation of the valve cylinder 5, receiving its motive power from any appropriate transmission mechanism of the engine; and that the invention is not limited to this specific means of rotating the valve member 5.

Although, I have described this embodiment of my invention specifically, I do not intend to limit my patent protection to these exact details of construction and arrangement; for the invention is susceptible of numerous changes within the scope of the inventive ideas as implied and claimed.

What I claim as my invention is:

1. In a valve, the combination of a casing having outer and inner walls, the outer wall having an outlet, the inner wall having an outlet, a rotor journaled in the casing and having a fluid-passage therethrough in such relation that it moves into and out of communication with the outlet of the inner wall each time the rotor revolves, means to introduce fluid into said passage, and a valve-closure adjustably seated between the outlets of the inner and outer walls.

2. The structure defined by claim 1, said outer wall being formed with a journal-bearing for said rotor, said rotor having a journal in said journal-bearing and provided with a driving gear-member on said journal, the receiving end of said passage being axially alined with said journal, and the fluid-introducing means being continually in registration with said receiving end.

3. The structure defined by claim 1, said outer wall constituting two initially separate semi-cylindrical members and a segmental peripheral member united to form a hollow cylinder, said inner wall comprising a hollow cylinder secured within the outer wall, said outer wall having axially parallel segmental projections which are recessed to provide a valve-seat and guide-way between them and said segmental peripheral member, said valve closure constituting an apertured plate and provided with means to slide it along said guide-way so as to move its aperture into and out of communication with said outlets and to regulate the flow of fluid through said outlets.

4. The structure defined by claim 1, said outlet of the inner wall constituting a peripherally extending slot, said valve closure comprising a plate having a triangular opening therethrough in such relation that one of its edges crosses said slot diagonally in different adjustments of this valve closure.

In testimony whereof I affix my signature.

HARRINGTON WEBB DAIN.